US012002292B2

(12) United States Patent
Furukawa

(10) Patent No.: US 12,002,292 B2
(45) Date of Patent: Jun. 4, 2024

(54) ONLINE CALIBRATION OF 3D SCAN DATA FROM MULTIPLE VIEWPOINTS

(71) Applicant: SONY GROUP CORPORATION, Tokyo (JP)

(72) Inventor: Kendai Furukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 383 days.

(21) Appl. No.: 17/309,335

(22) PCT Filed: Nov. 26, 2019

(86) PCT No.: PCT/US2019/063195
§ 371 (c)(1),
(2) Date: May 19, 2021

(87) PCT Pub. No.: WO2020/112733
PCT Pub. Date: Jun. 4, 2020

(65) Prior Publication Data
US 2022/0012476 A1 Jan. 13, 2022

Related U.S. Application Data

(60) Provisional application No. 62/772,526, filed on Nov. 28, 2018.

(51) Int. Cl.
G06V 40/20 (2022.01)
G01S 7/48 (2006.01)
(Continued)

(52) U.S. Cl.
CPC ............ *G06V 40/23* (2022.01); *G01S 7/4808* (2013.01); *G01S 17/89* (2013.01); *G06T 7/251* (2017.01);
(Continued)

(58) Field of Classification Search
CPC ..... G06T 7/251; G06T 7/596; G06T 2200/08; G06T 2207/10021; G06T 2207/30196; G06V 40/23; G01S 7/89; G01S 7/4808
See application file for complete search history.

(56) References Cited

U.S. PATENT DOCUMENTS 9,959,671 B1 * 5/2018 Carriere, IV ........ H04N 13/257
2009/0232353 A1 9/2009 Sundaresan et al.
(Continued)

FOREIGN PATENT DOCUMENTS

CN 106709947 A 5/2017

OTHER PUBLICATIONS

Tzionas, et al. (3D Object Reconstruction from Hand-Object Interactions), pp. 729-737. (Year: 2015).*
(Continued)

Primary Examiner — Daniel G Mariam
(74) Attorney, Agent, or Firm — CHIP LAW GROUP

(57) ABSTRACT

A calibration system and method for online calibration of 3D scan data from multiple viewpoints is provided. The calibration system receives a set of depth scans and a corresponding set of color images of a scene that includes a human-object as part of a foreground of the scene. The calibration system extracts a first three-dimensional (3D) representation of the foreground based on a first depth scan and spatially aligns the extracted first 3D representation with a second 3D representation of the foreground. The first 3D representation and the second 3D representation are associated with a first viewpoint and a second viewpoint, respectively, in a 3D environment. The calibration system updates the spatially aligned first 3D representation based on the set of color images and a set of structural features of the
(Continued)

human-object and reconstructs a 3D mesh of the human-object based on the updated first 3D representation of the foreground.

16 Claims, 5 Drawing Sheets

(51) Int. Cl.
  *G01S 17/89* (2020.01)
  *G06T 7/246* (2017.01)
  *G06T 7/593* (2017.01)

(52) U.S. Cl.
  CPC .......... *G06T 7/596* (2017.01); *G06T 2200/08* (2013.01); *G06T 2207/10021* (2013.01); *G06T 2207/30196* (2013.01)

(56) References Cited

U.S. PATENT DOCUMENTS

2017/0046868 A1 2/2017 Chernov et al.
2017/0064287 A1 3/2017 Borisov

OTHER PUBLICATIONS

Alexiadis, et al. (Real-Time, Full 3-D Reconstruction of Moving Foreground Objects From Objects From Multiple Consumer Depth Cameras), pp. 339-358. (Year: 2013).*

Chuen-Chien Lee et al.: "Free viewpoint video (FVV) survey and future research direction", APSIPA Transactions on Signal and Information Processing, vol. 4, 2015, par. I-III, fig. 4, 7-14.

Collet A. et al.: "High-Quality Streamable Free-Viewpoint Video", ACM Transactions on Graphics, vol. 34, No. 4, 2015, par. 1, 6.3, 10, fig. 13, 15.

International Search Report and Written Opinion of PCT Application No. PCT/JP2019/063195, dated Mar. 12, 2020.

Thiemo Alldieck, Video Based Reconstruction of 3D People Models, CVPR 2018 Spotlight, IEEE Conference on Computer Vision and Pattern Recognition 2018.

Yan Cui et al.: "KinectAvatar: Fully Automatic Body Capture Using a Single Kinect", Computer Vision—ACCV 2012.

* cited by examiner

ONLINE CALIBRATION OF 3D SCAN DATA FROM MULTIPLE VIEWPOINTS

CROSS REFERENCE TO RELATED APPLICATIONS

This application is a U.S. National Phase of International Patent Application No. PCT/US2019/063195 filed on Nov. 26, 2019, which claims priority benefit of U.S. Patent Application No. 62/772,526 filed in the U.S. Patent Office on Nov. 28, 2018. Each of the above-referenced applications is hereby incorporated herein by reference in its entirety.

FIELD

Various embodiments of the disclosure relate to computer vision, three-dimensional (3D) scanning, and 3D surface registration technology. More specifically, various embodiments of the disclosure relate to a calibration system and method for online calibration of 3D scan data from multiple viewpoints.

BACKGROUND

Recent advancements in computer vision, three-dimensional (3D) scanning, and 3D surface registration have led to development of various techniques for 3D human model estimation. A 3D mesh is typically a structural build of a 3D model consisting of polygons. 3D meshes use reference points in X, Y and Z axes to define shapes with height, width and depth. 3D models are used to portray real-world and conceptual visuals for art, entertainment, and simulation and are integral to many different industries. Most of the state of the art methods use only geometry cues or human skeleton feature information for human 3D model estimation. In the former method, calibration result may be temporally inconsistent due to a small geometry overlap. Whereas, in the latter method, calibration accuracy may not be enough for a reliable human 3D model reconstruction.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A calibration system and method for online calibration of 3D scan data from multiple viewpoints is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in a disclosed calibration system and method for online calibration of 3D scan data from multiple viewpoints. Exemplary aspects of the disclosure provide a calibration system that may be configured to generate a 3D mesh of an object-of-interest (for example, a human-object). The calibration system may receive a set of depth scans and a corresponding set of color images of a scene that include a human-object as part of a foreground of the scene. The set of depth scans and the corresponding set of color images of the scene may be acquired by a plurality of scanning devices (for example, an RGB-D sensor) from a corresponding set of viewpoints in a 3D environment. The reconstructed 3D mesh may correspond to one frame of a temporal sequence of frames of, for example, a free-viewpoint video, which may virtually re-enact the performance of the human-object in 3D.

In contrast with the conventional techniques, the disclosed calibration system may reconstruct the 3D mesh of the human-object to have fewer temporal flickers in successive temporal frames, as compared to conventional techniques. The reconstructed 3D mesh of the human-object may be more consistent with a shape, articulate//non-articulate body motion, and/or structural features of the human-body. This may be a result of a pairwise application of foreground alignment, background alignment, structural feature alignment on correspondences of 3D points associated with a pair of depth scans. Additionally, in contrast with the conventional techniques, the disclosed calibration system may reconstruct the 3D mesh of the human-object 110 with a sparse network of scanning devices (e.g., ~4) as compared to a dense network of scanning devices (~100) typically used by conventional methods. In a conventional studio environment, position of the network of scanning devices is fixed and movement of the human-object (i.e. the performer) in time is restricted to a limited area. Whereas, the disclosed calibration system uses a moving network of network of scanning devices to record the performance of the human-object in all types of 3D environment. Therefore, there is/are no restriction(s) in movement of the human-object in the 3D environment as compared to the conventional studio environment. As a result, the calibration system 102 offers a more cost-effective and easier-to-use solution as compared to conventional techniques.

Figure 1:
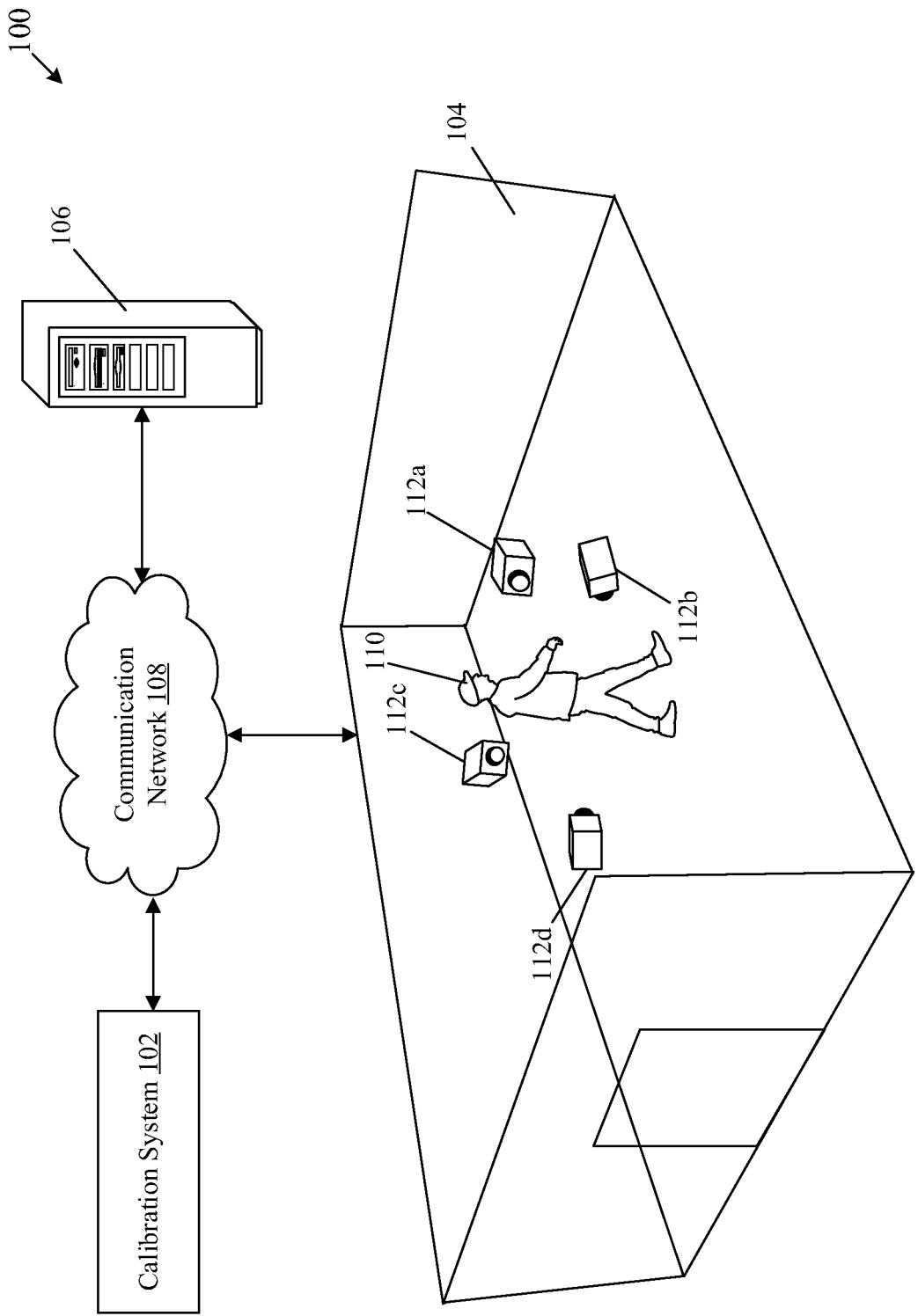
FIG. 1 is a diagram that illustrates an exemplary network environment for online calibration of three-dimensional (3D) scan data from multiple viewpoints, in accordance with an embodiment of the disclosure.

FIG. 1 is a diagram that illustrates an exemplary network environment for online calibration of three-dimensional (3D) scan data from multiple viewpoints, in accordance with an embodiment of the disclosure. With reference to FIG. 1, there is shown a network environment 100. The network environment 100 may include a calibration system 102, a 3D environment 104, a server 106, and a communication network 108. In the 3D environment 104, there is shown a human-object 110 surrounded by a plurality of scanning devices 112a, 112b, 112c, and 112d. The plurality of scanning devices 112a, 112b, 112c, and 112d may be sparsely located at multiple viewpoints in the 3D environment 104 and may collectively form a multi-camera network having a combined field-of-view (FoV) that covers an entire surface of the human-object 110. The human-object 110 may be a part of the foreground of a scene in the 3D environment 104. The scene may also include other objects, details and illustrations of which are omitted from the disclosure for the sake of brevity. The calibration system 102 may be communicatively coupled to the plurality of scanning devices 112a, 112b, 112c, and 112d and the server 106, via the communication network 108.

It should be noted that the position, orientation, arrangement, and number of the plurality of scanning devices 112a, 112b, 112c, and 112d in FIG. 1 is merely presented as an example and should not be construed as limiting for the disclosure. The present disclosure may be also applicable to other positions, orientations, arrangements, and more or less numbers of scanning devices, without a deviation from scope of the disclosure.

The calibration system 102 may include a suitable logic, circuitry, interfaces, and/or code that may be configured to execute an online calibration of 3D scan data acquired from multiple viewpoints and reconstruct a 3D mesh of the human-object 110 from the 3D scan data once the online calibration of the 3D scan data is done. Examples of the calibration system 102 may include, but are not limited to, a video processing device, a video editing system, a video editing controller, a media production system, a computer workstation, a mainframe computer, a handheld computer, a mobile phone, a smart appliance, a video player, a digital camera, a video camera, a server, and/or other computing devices with 3D graphics processing capability.

In FIG. 1, the calibration system 102 and the plurality of scanning devices 112a, 112b, 112c, and 112d are shown as two separate entities; however, in some embodiments, the entire functionality of the plurality of scanning devices 112a, 112b, 112c, and 112d may be incorporated in the calibration system 102, without a deviation from scope of the disclosure.

The 3D environment 104 may be a built environment (e.g., an indoor, an outdoor, or a studio space) or a natural environment in which a 3D scan of the human-object 110 may be performed from a set of viewpoints to acquire a set of depth scans (i.e. partial depth scans) and a corresponding set of color images of a scene that includes the human-object 110.

The server 106 may include a suitable logic, circuitry, interfaces, and code that may be configured to receive and store the set of depth scans and the corresponding set of color images, acquired from a corresponding set of viewpoints in the 3D environment 104. Herein, the set of depth scans and the corresponding set of color images may represent one time-instant of a performance of the human-object in the 3D environment 104.

In at least one embodiment, the server 106 may act as a repository of human-performances, where each human-performance may include a temporal sequence of reconstructed 3D meshes of the human-object 110, which when rendered, may re-enact a past and 3D scanned performance of a human-object (i.e. a performer of interest) in a 3D environment. The server 106 may be implemented as a cloud server which may execute operations through, but not limited to, web applications, cloud applications, HTTP requests, repository operations, file transfer, and the like. Other examples of the server 106 may include, but are not limited to, a database server, a file server, a web server, a media server, an application server, a mainframe server, a cloud server, or other types of servers.

In at least one embodiment, the server 106 may be implemented as a plurality of distributed cloud-based resources by use of several technologies that are well known to those skilled in the art. A person with ordinary skill in the art may understand that the scope of the disclosure is not limited to implementation of the server 106 and the calibration system 102 as separate entities. In certain embodiments, the functionalities of the server 106 may be incorporated in its entirety or at least partially in the calibration system 102, without a departure from the scope of the disclosure.

The communication network 108 may include a communication medium through which the calibration system 102, the server 106, and the plurality of scanning devices 112a, 112b, 112c, and 112d may communicate with each other. The communication network 108 may be a wired or a wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The plurality of scanning devices 112a, 112b, 112c, and 112d may include a suitable logic, circuitry, interfaces, and/or code that may be configured to acquire the set of depth scans and the corresponding set of color images of a scene from a corresponding set of viewpoints in the 3D environment 104. In general, a viewpoint of a scanning device at any given time-instant may be defined, for example, by a relative position of the scanning device in the 3D environment 104, a scanning angle of the scanning device, and/or a relative orientation of the scanning device. It should be noted that one or more scanning devices of the plurality of scanning devices 112a, 112b, 112c, and 112d may be configured to be movable in the 3D environment 104. For example, the 3D environment 104 may include multiple camera-operators. Each camera-operator may hold a scanning device (e.g., an RGB-D camera) and may move the scanning device to record a performance of a performer (e.g., the human-object 110), as a sequence of depth maps and/or a sequence of color images. Therefore, for the scanning device, the viewpoint associated with every depth map and every color image may either remain same or may change at any time-instant with the movement of the scanning device.

By way of example, and not limitation, the plurality of scanning devices 112a, 112b, 112c, and 112d may include the first scanning device 112a, the second scanning device 112b, the third scanning device 112c, and the fourth scanning device 112b. The first scanning device 112a, the second scanning device 112b, the third scanning device 112c, and the fourth scanning device 112d may collectively form a multi-camera network and may have a combined filed-of-view that may cover an entire surface of the human-object 110 present in the scene. The multi-camera network may be referred to as sparse-view camera network in cases where the multi-camera network includes at most three or four scanning devices.

In one embodiment, each scanning device of the plurality of scanning devices 112a, 112b, 112c, and 112d may include one or more sensors, such as a combination of a depth sensor, a color sensor, (such as a red-green-blue (RGB) sensor), and/or an infrared (IR) sensor that may capture the plurality of color images or a 3D video of the human-object 110 from a particular viewing angle.

In another embodiment, at least one of the plurality of scanning devices 112a, 112b, 112c, and 112d may be an active 3D scanner that relies on radiations or light to scan a 3D structure of the human-object 110 and to record the performance of the human-object 110 as the set of depth scans and the corresponding set of color images. For example, the active 3D scanner may be a time-of-flight (TOF)-based 3D laser scanner, a laser range-finder, a TOF camera, a hand-held laser scanner, a structured light 3D scanner, a modulated light 3D scanner, an aerial Light Detection and Ranging (LiDAR) laser scanner, a 3D LiDAR, a 3D motion sensor, and the like.

In another embodiment, the plurality of scanning devices 112a, 112b, 112c, and 112d may be a network of heterogenous 3D sensors, for example, a network of standard cameras, depth sensors, time-of-flight cameras, omnidirectional cameras, and actuated laser scanners.

In operation, each scanning device of the plurality of scanning devices 112a, 112b, 112c, and 112d may capture, at regular time-steps, a depth scan and a color image of the scene from a particular viewpoint in the 3D environment 104. Such a viewpoint may change with a movement of the respective scanning device in the 3D environment 104. The depth scan may contain depth information in terms of a distance between points (sampled points) on the surface of the human-object 110 and an image-plane of a respective scanning device at the particular viewpoint. Similarly, the color image may contain information related to color, texture, lighting (or albedo) of points sampled on the surface of the human-object 110 from the same or a similar viewpoint. A specific body portion of the human-object 110 may be visible in each depth scan and the corresponding color image, while remaining body portion of the human-object 110 may remain occluded. Therefore, in some cases, the depth scan may also be referred to as a partial scan of the human-object 110.

Each scanning device of the plurality of scanning devices 112a, 112b, 112c, and 112d may transmit the acquired depth scan and the corresponding color image to the calibration system 102 via the communication network 108. The depth scan and the corresponding color image from each scanning device of the plurality of scanning devices 112a, 112b, 112c, and 112d may collectively form the set of depth scans and the corresponding set of color images, respectively. In some embodiments, a common node or the first scanning device 112a may be configured to collect the set of depth scans and the corresponding set of color images from the plurality of scanning devices 112a, 112b, 112c, and 112d and transmit the collected set of depth scans and the corresponding set of color images to the calibration system 102, via the communication network 108.

The plurality of scanning devices 112a, 112b, 112c, and 112d may form a sparse network of scanning devices, for example, with three to four scanning devices. Among the set of depth scans acquired via the sparse network of scanning devices at one time-instant, a degree of overlap of visible geometry information may be less than that for a dense network of scanning devices (e.g., ~100 scanning devices). Also, as relative positions of the plurality of scanning devices 112a, 112b, 112c, and 112d may change over time, the set of depth scans may often have lesser overlap (e.g., 10%-30%) among each other. Therefore, to reconstruct one temporal frame of a 3D mesh of the human-object 110, the set of depth scans may need to be globally registered from all viewpoints to ensure that the frame of 3D mesh remains temporally consistent with previous and subsequent frames of the 3D mesh. Once the set of depth scans and the corresponding set of color images are received, the calibration system 102 may initialize a process to perform a robust rigid registration of the set of depth scans so as to ensure that a watertight mesh (i.e. the 3D mesh) of the human-object 110 can be obtained based on the rigid registration of the set of depth scans.

As described herein, the initialized process may be a pairwise operation, performed between two partial scans of the human-object or two 3D representations (e.g., partial meshes) of the two partial scans from corresponding pair of viewpoints. In the pairwise operation, for one pair of partial scans or a pair of 3D representations, a candidate transformation (Ti,j) may be selected from among multiple candidate transformation. The selected candidate transformation may optimally align one 3D representation associated with one viewpoint to another 3D representation associated with another viewpoint. It should be noted here that the initialized process may be iteratively performed for every other pair of 3D representations (obtained from the set of depth scans) till there are many selected candidate transformations (also referred to as transformation set) that individually align one 3D representation to another 3D representation, optimally.

The calibration system 102 may receive the set of depth scans and the corresponding set of color images of the scene. The scene may include the human-object 110 as a part of the foreground of the scene. From the received set of depth scans, the calibration system 102 may select a first depth scan associated with a first viewpoint and a second depth scan associated with a second viewpoint. Such selections may be based on a distance between the first viewpoint and the second viewpoint. For example, two depth scans from two neighboring viewpoints may be selected. Alternatively, the first depth scan and the second depth scan may be selected based on random sampling of the set of depth scans. A description of the initialized process for one pair of 3D representations is provided herein.

The calibration system 102 may extract a first 3D representation (say P1) of the human-object 110 based on the first depth scan. Similarly, the calibration system 102 may extract a second 3D representation (say P2) of the human-object 110 based on the second depth scan. At this point, each of the first 3D representation and the second 3D representation may be a partial 3D mesh or a partial point cloud of the human-object 110. For example, the first 3D representation may correspond to a front body portion of the human-object 110 while the second 3D representation may correspond to a side body portion of the human-object 110.

In at least one embodiment, a foreground alignment (FGA) operation may be executed by the calibration system 102, as described herein. The calibration system 102 may estimate a set of candidate transformations for a spatial alignment of the extracted first 3D representation with the second 3D representation. Thereafter, for each candidate transformation of the estimated set of candidate transformations, the calibration system 102 may compute a visibility error-metric. The estimation of set of candidate transformations and the computation of the visibility error-metric are described in detail, for example in FIGS. 3A and 3B. Once computed, the calibration system 102 may select a candidate transformation from the estimated set of candidate transformations for which the computed visibility error-metric is a minimum. Based on the selected candidate transformation, the calibration system 102 may spatially align the extracted first 3D representation with the second 3D representation. After the spatial alignment, points, especially near boundary region of the first 3D representation may be aligned with points of the second 3D representation.

In certain scenarios, even after the FGA operation, a set of structural features, for example, a skeleton-prior, a hand-prior, a face-prior, eyes-prior, etc., of the human-object 110 in the spatially aligned first 3D representation may still need to be corrected. If left uncorrected, such structural features may appear to be misaligned with each other when such structural features are incorporated in a 3D mesh obtained based on the set of depth scans. Also, in successive temporal frames of the 3D mesh, such misalignment may cause texture misalignment as wells as lead to a jagged body motion. In at least one embodiment, a structural feature alignment (SFA) operation may be performed. In the SFA operation, the calibration system 102 may update the spatially aligned first 3D representation of the human-object 110 based on the received set of color images and a set of structural features of the human-object 110, as a human-prior.

By way of example, and not limitation, the calibration system 102 may estimate a first set of two-dimensional (2D) feature points for the set of structural features of the human-object 110 based on a first color image of the corresponding set of color images. Similarly, the calibration system 102 may estimate a second set of 2D feature points for the set of structural features of the human-object 110 based on a second color image of the corresponding set of color images. Herein, for reference, the first color image may correspond to the first depth scan associated with the first viewpoint and the second color image may correspond to the second depth scan associated with the second viewpoint in the 3D environment 104. From the first set of 2D feature points, a 2D feature point for an eye-prior (as a structural feature) of the human-object 110 may include an in-image coordinate of a key-point in an eye region of the human-object 110 in the first color image.

Based on the estimated first set of 2D feature points and the estimated second set of 2D feature points, the calibration system 102 may compute a set of 3D feature points for the set of structural features. As an example, in the set of 3D feature points, a 3D feature point for the eye may include a 3D coordinate value (X, Y, Z) of a key-point in the eye-region. Such a 3D coordinate value may be estimated via a triangulation method, which may be known to one ordinarily skilled in the art. Based on the computed set of 3D feature points, the spatially aligned first 3D representation may be updated. An exemplary process to update the spatially aligned first 3D representation is provided in detail, for example, in FIGS. 3A and 3B. Similar to the update of the first 3D representation, other 3D representations of the foreground of other depth scans may be updated. Once all 3D representations (including the first and other 3D representations) from the set of viewpoints are updated, the calibration system 102 may globally align all the 3D representations from the set of viewpoints. Once globally aligned, the set of depth scans or the 3D representations of the set of depth scans may be considered to be globally registered. Thereafter, the calibration system 102 may reconstruct the 3D mesh of the human-object 110 based on the updated first 3D representation and/or the updated other 3D representations of the foreground. The reconstructed 3D mesh may correspond to one frame of a temporal sequence of frames of, for example, a free-viewpoint video, which may virtually re-enact the performance of the human-object 110 in 3D.

In contrast with the conventional techniques, the disclosed calibration system 102 may generate the 3D mesh of the human-object 110 to have fewer temporal flickers in successive temporal frames, as compared to conventional techniques. The 3D mesh of the human-object 110 generated by the calibration system 102 may be more consistent with a shape, articulate//non-articulate body motion, and/or structural features of the human-body because of FGA and SFA of points in the set of depth scans. Additionally, in contrast with the conventional techniques, the disclosed calibration system 102 generates the 3D mesh of the human-object 110 with a sparse network of scanning devices (e.g., ~4) as compared to a dense network of scanning devices (~100) used in the conventional methods.

In a conventional studio environment, a position of a network of scanning devices is fixed and movement of the human-object 110 (i.e. the performer) in time is restricted to a limited area. Whereas, the disclosed calibration system 102 uses a moving network of scanning devices to record the performance of the human-object 110 in all types of 3D environment 104. Therefore, there is/are no restriction(s) in movement of the human-object 110 in the 3D environment 104 as compared to the conventional studio environment. As a result, the calibration system 102 offers a more cost-effective and easier-to-use solution as compared to conventional techniques.

Figure 2:
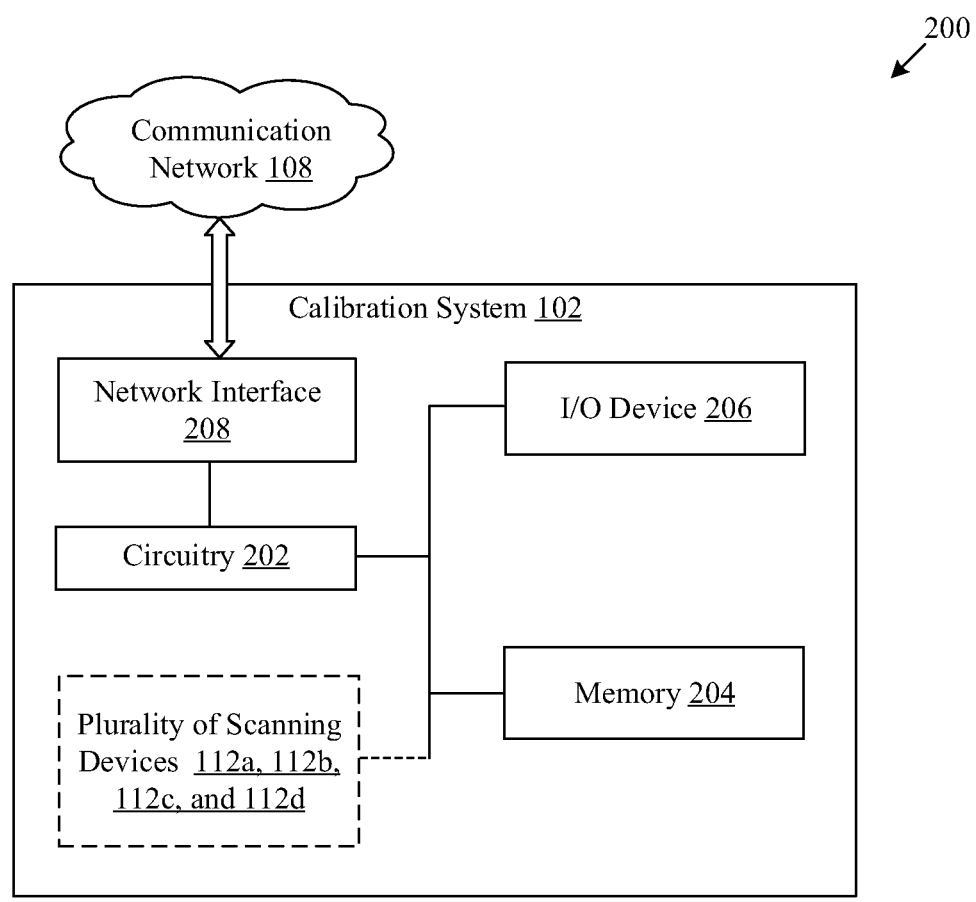
FIG. 2 is a block diagram that illustrates an exemplary calibration system for online calibration of 3D scan data from multiple viewpoints, in accordance with an embodiment of the disclosure.

FIG. 2 is a block diagram that illustrates an exemplary calibration system for online calibration of 3D scan data from multiple viewpoints, in accordance with an embodiment of the disclosure. FIG. 2 is explained in conjunction with elements from FIG. 1. With reference to FIG. 2, there is shown a block diagram 200 of the calibration system 102. The calibration system 102 may include circuitry 202, a memory 204, an input/output (I/O) device 206, and a network interface 208. The circuitry 202 may be communicatively coupled to the memory 204, the I/O device 206, and the network interface 208. In FIG. 2, there is further shown the first scanning device 112a of the plurality of scanning devices 112a, 112b, 112c, and 112d.

The circuitry 202 may include suitable logic, circuitry, and interfaces that may be configured to execute program instructions associated with different operations to be executed by the calibration system 102. The circuitry 202 may include one or more specialized processing units, which may be implemented as a separate processor or an integrated processor, or a cluster of processors that perform the functions of the one or more specialized processing units, collectively. The circuitry 202 may be implemented based on a number of processor technologies known in the art. Examples of implementations of the circuitry 202 may include, but are not limited to, an x86-based processor, a Graphics Processing Unit (GPU), a Video Processing Unit (VPU), a Reduced Instruction Set Computing (RISC) processor, an Application-Specific Integrated Circuit (ASIC) processor, a Complex Instruction Set Computing (CISC) processor, a microcontroller, a Central Processing Unit (CPU), and/or a combination thereof.

The memory 204 may include suitable logic, circuitry, and interfaces that may be configured to store the program instructions to be executed by the circuitry 202. The memory 204 may be configured to further store the set of depth scans and the corresponding set of color images of the scene, acquired from the set of viewpoints in the 3D environment 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, and interfaces that may be configured to facilitate communication between the circuitry 202, the server 106, and/or the plurality of scanning devices 112a, 112b, 112c, and 112d, via the communication network 108. The network interface 208 may be implemented by use of various known technologies to support wired or wireless communication of the calibration system 102 via the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the calibration system 102, as described in FIG. 1, may be performed by the circuitry 202. The operations of the circuitry 202 are described in detail, for example, in FIGS. 3A and 3B.

Figure 3A:
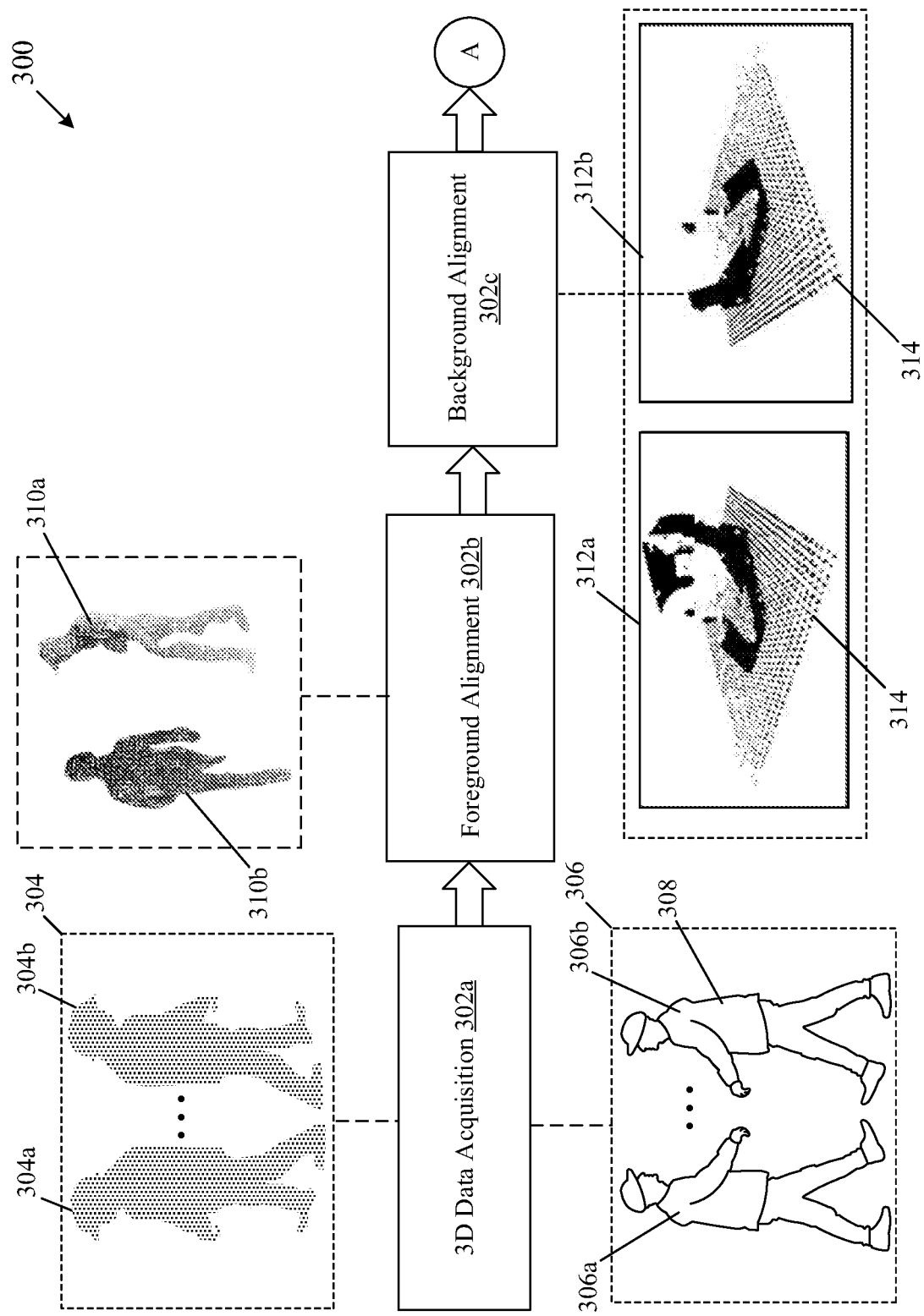
FIGS. 3A and 3B are diagrams that collectively illustrate exemplary set of operations for online calibration of 3D scan data from multiple viewpoints, in accordance with an embodiment of the disclosure.
Figure 3B:
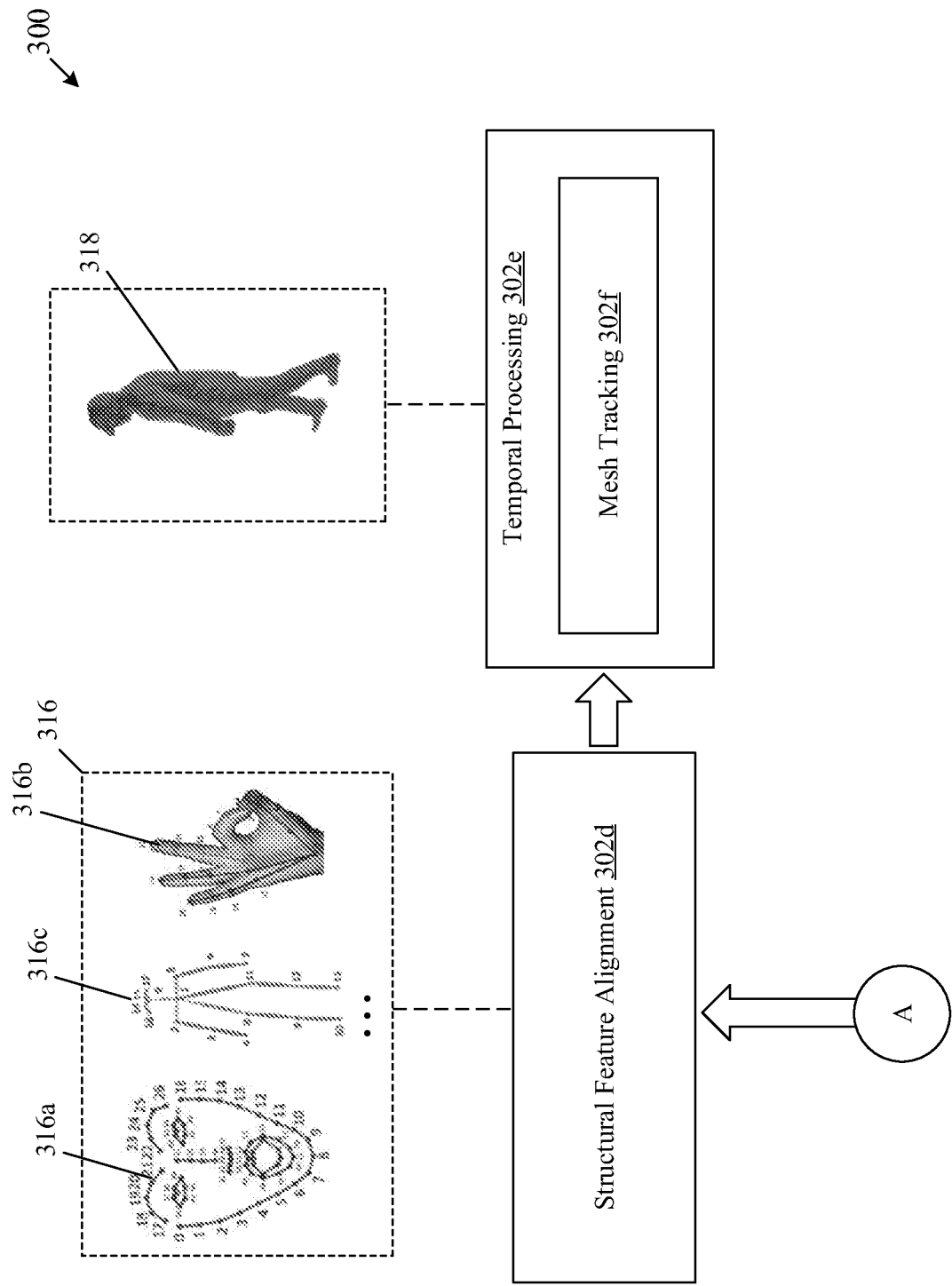

FIGS. 3A and 3B are diagrams that collectively illustrate exemplary set of operations for online calibration of 3D scan data from multiple viewpoints, in accordance with an embodiment of the disclosure. FIGS. 3A and 3B are described in conjunction with elements from FIG. 1 and FIG. 2. With reference to FIGS. 3A and 3B, there is shown a processing pipeline 300 that includes a set of operations 302a to 302f, as described herein.

At 302a, a 3D data acquisition operation may be executed. In 3D data acquisition operation, the plurality of scanning devices 112a, 112b, 112c, and 112d may acquire a set of depth scans 304 and a corresponding set of color images 306 of a scene in the 3D environment 104. The scene may include a human-object 308 as part of the foreground of the scene and other objects (for example, a table, a television set, etc.) as background of the scene. Each scanning device of the plurality of scanning devices 112a, 112b, 112c, and 112d may acquire a depth scan and a color image of the scene from a viewpoint that is different from a viewpoint of every other scanning device of the plurality of scanning devices 112a, 112b, 112c, and 112d.

As an example, each scanning device of the plurality of scanning devices 112a, 112b, 112c, and 112d may be a 3D imaging handheld camera that may include a depth sensor to acquire a depth scan (e.g., a depth map or a point cloud) of the scene and an image sensor to acquire a color image (e.g., in high-resolution) of the scene. Each scanning device of the plurality of scanning devices 112a, 112b, 112c, and 112d may be configured to transmit the acquired depth scan, the corresponding color image, and/or information about its viewpoint to the calibration system 102.

At the calibration system 102, the circuitry 202 may receive the set of depth scans 304 and the corresponding set of color images 306 of the scene from a corresponding set of viewpoints in the 3D environment 104. Each depth scan of the set of depth scans 304 and the corresponding color image of the corresponding set of color images 306 may be acquired by a respective scanning device, simultaneously, in a time-synchronized manner. For example, while one scanning device may be positioned to capture a depth scan and a respective color image from a viewpoint that covers a back body portion of the human-object 308, other scanning devices may be positioned to capture depth scans and respective color images from viewpoints that cover side body portions and a front body portion of the human-object 308.

The plurality of scanning devices 112a, 112b, 112c, and 112d may form a sparse network of scanning devices (e.g., ~3 to 4 scanning devices) that may have a combined field-of view to cover the entire surface of the human-object 308. The sparse network of scanning devices may acquire the set of depth scans 304 from the set of viewpoints which changes as the position of individual scanning device in the sparse network changes with time. At any particular time-instant, among the set of depth scans 304, a degree of overlap of visible geometry information may be less (especially near boundary regions) than that for a more conventional dense network of scanning devices (e.g., ~100 scanning devices). Also, as relative positions of the plurality of scanning devices 112a, 112b, 112c, and 112d may change over time, these set of depth scans 304 may often have lesser overlap (e.g., 10%-30%) among each other. Therefore, to reconstruct one temporal frame of a 3D mesh of the human-object 308, these set of depth scans 304 may need to be globally registered from all viewpoints to ensure that the temporal frame of the 3D mesh remains temporally consistent with previous and subsequent temporal frames of the 3D mesh. Therefore, the circuitry 202 may initialize a process to perform a rigid registration of the set of depth scans 304 so as to ensure that a watertight mesh (i.e. the 3D mesh) of the human-object 308 can be reconstructed. Operations to perform the rigid registration are provided herein.

In at least one embodiment, a pairwise selection of two depth scans of the set of depth scans 304 may be performed. Such selection may be based on, for example, a random sampling method or a neighborhood condition based on which a first depth scan 304a and a second depth scan 304b from two neighboring viewpoints may be selected.

The circuitry 202 may extract a first 3D representation 310a of a foreground of the scene based on the first depth scan 304a. Similarly, the circuitry 202 may extract a second 3D representation 310b of the foreground based on the second depth scan 304b. The foreground of the scene may include the human-object 308 and therefore, the extracted first 3D representation 310a and the extracted second 3D representation 310b may be represent the human-object 308 from a first viewpoint and a second viewpoint, respectively. Each of the first 3D representation 310a and the second 3D representation 310b may be a partial point cloud, a partial mesh, or a partially textured mesh of the human-object 308. By way of example, as the first depth scan 304a may be a 2D depth map of the scene, the circuitry 202 may extract 3D points belonging to the foreground of the 2D depth map, as a 3D representation of the foreground. The extracted 3D points may be either used as a partial point cloud or constructed as a partial mesh.

At 302b, a foreground alignment (FGA) operation may be executed. In the FGA operation, the circuitry 202 may spatially align the extracted first 3D representation 310a with the second 3D representation 310b. Typically, points that belong to the foreground (especially near boundary regions of the foreground) of one depth scan may not completely align with respective points that belong to the foreground of another depth scan from a different viewpoint. If left uncorrected, such misalignment may lead to misalignment of texture on a 3D mesh of the human-object 308 as well as a temporal flicker when such 3D mesh is rendered as one temporal frame in a sequence of temporal frames of the 3D mesh.

The circuitry 202 may spatially align the extracted first 3D representation 310a with the second 3D representation 310b of the foreground. By way of example, and not limitation, let $P_1$ and $P_2$ may be the first 3D representation 310a and the second 3D representation 310b, extracted from the first depth scan 304a and the second depth scan 304b, respectively. The circuitry 202 may estimate a set of candidate transformations for the spatial alignment of the extracted first 3D representation 310a with the second 3D representation 310b. Each candidate transformation ($T_{12}$) of the set of candidate transformations may be a global Euclidean transformation that may align $P_2$ to $P_1$. Thereafter, for each candidate transformation ($T_{12}$), the circuitry 202 may compute a visibility error-metric, as described herein.

By way of an example, and not limitation, let $P_1$ and $P_2$ be considered as two partial meshes (i.e. the first 3D representation 310a and the second 3D representation 310b), with $P_1$ captured using the first scanning device 112a at a position $c_p$ and a view direction $c_v$. For every point $x \in P_2$, let $I(x)$ be a first intersection point of $P_1$ and a ray $\vec{c_p x}$. The circuitry 202 may partition the $P_2$ into three regions and associate to each region an energy density $d(x, P_1)$. The energy density $d(x, P_1)$ may measure an extent to which points x in that region violate a visibility criteria, as follows:
1. Points $x \in O$ that may be occluded by $P_1$: $\|x-C_p\| \geq \| I(x)-C_p\|$. To such points in this region, the circuitry 202 may associate no energy, as given by equation (1):

$$d_O(x,P_1)=0 \qquad (1)$$

2. Points $x \in F$ that may be in front of $P_1$: $\|x-C_p\| < \|I(x)-C_p\|$. Such points may exist even when $P_1$ and $P_2$ are well-aligned, due to surface noise and roughness. The circuitry 202 may penalize large violations, as given in equation (2):

$$d_F(x,P_1)=\|x-I(x)\|^2 \qquad (2)$$

3. Points $x \in B$ for which $I(x)$ does not exist. Such points may also violate visibility criteria. Therefore, the circuitry 202 may penalize x using a squared distance function, given by equation (3), as follows:

$$d_B(x, P_1) = \min_{y \in S_1} \|P_{CV}x - P_{CV}y\|^2 \qquad (3)$$

where, $P_{cv}$ is a projection $I-C_v C_v^T$ onto the image plane orthogonal to $C_v$. Alignment of $P_1$ and $P_2$ from a point of view of $P_1$ may be measured by an aggregate energy: $d(P_2, P_1)=\Sigma_{x \in P_2} d(x, P_1)$. Finally, every Euclidean transformation ($T_{12}$) (i.e. a candidate transformation) that may produce a possible alignment between $P_1$ and $P_2$ may be associated with an energy to define a visibility error-metric, as given by equation (4):

$$E(T_{12})=d(T_{12}^{-1}P_1,P_2)+d(T_{12}P_2,P_1) \qquad (4)$$

The circuitry 202 may minimize the visibility error-metric (as given in equation (4), for example) by solving a nonlinear least squares problem, using for example, Gauss-Newton method. The circuitry 202 may select a candidate transformation ($T_{12}'$) from the estimated set of candidate transformations for which the computed visibility error-metric is a minimum and spatially align the extracted first 3D representation 310a with the second 3D representation 310b based on the selected candidate transformation. The spatially aligned first 3D representation 310a may be the output of the FGA operation.

It should be noted here that the initialized process may be iteratively performed for every other pair of 3D representations (obtained from the set of depth scans) till there are many selected candidate transformations (also referred to as transformation set) that individually align one 3D representation to another 3D representation, optimally.

At 302c, a background alignment (BGA) operation may be executed. In BGA operation, the circuitry 202 may extract a third 3D representation 312a of a ground surface 314 in the scene based on the first depth scan 304a associated with the first viewpoint. Similarly, the circuitry 202 may extract a fourth 3D representation 312b of the ground surface 314 in the scene based on the second depth scan 304b associated with the second viewpoint. The circuitry 202 may spatially align the extracted third 3D representation 312a with the fourth 3D representation 312b, for example, based on a candidate transformation (T') between the extracted third 3D representation 312a of the ground surface 314 with the fourth 3D representation 312b of the ground surface 314.

With such spatial alignment, an effect of over shrinking of points may be suppressed in the foreground of the first depth scan 304a and the second depth scan 304b, respectively. The circuitry 202 further update the spatially aligned first 3D representation 310a based on the spatial alignment of the extracted third 3D representation 312a with the fourth 3D representation 312b. The updated first 3D representation 310a may have less geometry and texture misalignment as compared to the spatially aligned first 3D representation 310a (obtained after the FGA operation at 302b).

At 302d, a structural feature alignment operation (SFA) may be executed. In SFA operation, the circuitry 202 may refine the updated first 3D representation 310a based on a set of structural features 316 of the human-object 308, as a human-prior. The set of structural features 316 may include, for example, a face prior 316a, a hand prior 316b, and a skeleton joint prior 316c of the human-object 308 and may be generated using deep learning methods, known to one ordinarily skilled in the art. For example, one or more of the set of structural features 316 of the human-object 308 may be represented in terms of body, hand, facial, or foot key-points and associated linear blend skinning (LBS) parameters. These key-points and LBS parameters may be extracted by providing the set of color images 306 from multiple viewpoints as input to a multi-stage convolutional network, which may be pre-trained for human pose estimation from color images associated with multiple viewpoints and key-point extraction from the color images based on the human pose estimation.

The circuitry 202 may estimate a first set of 2D feature points for the set of structural features 316 of the human-object 308 based on a first color image 306a of the corresponding set of color images 306. Similarly, based on a second color image 306b, the circuitry 202 may estimate a second set of 2D feature points for the set of structural features 316. For example, the circuitry 202 may detect the set of structural features 316 of the human-object 308 in the first color image 306a and the second color image 306b. Thereafter, 2D feature point(s) for each structural feature may be estimated based on the detection of the set of structural features 316 in the first color image 306a and the second color image 306b. These 2D feature points may be key-points, for example, in terms of in-image coordinates (x-y coordinates), of the set of structural features 316.

The circuitry 202 may compute a set of 3D feature points for the set of structural features 316 based on the estimated first set of 2D feature points and the estimated second set of 2D feature points. In accordance with an embodiment, each 3D feature point for a particular structural feature may be triangulated from a first 2D feature point and a second 2D feature point for the particular structural feature in the first color image 306a and the second color image 306b, respectively. For example, the 3D feature point may be a 3D coordinate with an x, y, and z value, triangulated from an $x_1$, $y_1$ coordinate of a 2D feature point in the first color image 306a and $x_2$, $y_2$ coordinate of the 2D feature point in the second color image 306b.

Based on the computed set of 3D feature points, the circuitry 202 may further update the first 3D representation 310a, spatially aligned with the second 3D representation 310b. By way of example, the first 3D representation 310a may include a first plurality of 3D points which represent at least a surface portion of the human-object 308 from the first viewpoint. The circuitry 202 may compute a distance between the computed set of 3D feature points and a portion of the first plurality of 3D points which correspond to the set of structural features 316 in the extracted first 3D representation 310a. In certain embodiments, the circuitry 202 may estimate a global energy function based on the computed distance and update the spatially aligned first 3D representation 310a based on whether the estimated global energy function is a minimum.

By way of an example, and not limitation, the global energy function for the FGA operation, the BGA operation, and the SFA operation may be represented by equation (5), as follows:

$$E = \mathrm{argmin}_T \sum_{i \neq j} \left\{ \begin{array}{c} d_f(T_{ij}P_i, P_j) + d_f(T_{ji}P_j, P_i) + d_b((T_{ji}^{-1})^T C_j, P_{gnd_i}) + \\ d_s(R(T_{1i}^{-1}, P_{SFA_i}), R(T_{1j}^{-1}, P_{SFA_j})) \end{array} \right\} \quad (5)$$

where,

E may represent the global energy function, $P_i$ and $P_j$ may represent an $i_{th}$ 3D representation and a $j_{th}$ 3D representation extracted from the set of depth scans 304, i and j may represent indices of the $i_{th}$ 3D representation and the $j_{th}$ 3D representation $d_i$ may represent an energy density associated with the $i_{th}$ 3D representation, $T_{ij}$ is the Euclidean transformation that produces a possible alignment between $P_i$ and $P_j$, and R may represent a rotational component.

The global energy function (for example, of equation (5)) may need to be solved to minimize the value of the global energy function, which, as a result, may correct spatial misalignment, background misalignment, and/or structural feature misalignment between points in the first 3D representation 310a and respective points in the second 3D representation 310b. It should be noted here that the global energy functions may be solved in a pairwise manner, whereby a solution for the global energy function may be obtained for every pair of 3D representation (Pi, Pj, where i, j∈N and i≠j) and suitable candidate transformations (Tij) may be selected when the solution is a minimum. These suitable candidate transformations (Tij) may be used to individually align 3D representations with each other and thereby may result in a global rigid registration of the set of depth scans 304 (or the 3D representation of the set of depth scans 304) associated with the set of viewpoints.

In at least one embodiment, the circuitry 202 may minimize the global energy function of equation (5) by using suitable optimization methods, such as, but not limited to, particle swarm optimization (PSO) method. The spatially aligned first 3D representation 310a may be updated further based on whether the estimated global energy function is a minimum. For example, by solving the global energy function, suitable candidate transformations for FGA, BGA, and SFA may be selected. With application of the selected candidate transformations, 3D representations of all the depth scans may be corrected for FGA, BGA, and SFA. Once corrected, the circuitry 202 may reconstruct a 3D mesh 318 of the human-object 308 based on the updated first 3D representation 310a and/or 3D representations from other viewpoints of the set of viewpoints. The reconstructed 3D mesh 318 may correspond to a watertight mesh that may at partially capture a texture of the human-object 308 in the corresponding set of color images 306. By way of example, and not limitation, there may be a need to refine the texture of the reconstructed 3D mesh 318. Therefore, neighboring or distant meshes of the human-object 308, such as past temporal frames of 3D mesh of the human-object 308 may be used to refine the texture of the reconstructed 3D mesh 318. The circuitry 202 may determine unreliable texture regions on the reconstructed 3D mesh 318 and transfer texture values from reliable texture regions of temporally neighboring or distant meshes of the human-object 308 to the unreliable texture regions on the reconstructed 3D mesh 318. These reliable regions may correspond to regions in the temporally neighboring or distant meshes with a reliable texture. Based on the transfer of the texture values from the reliable texture regions to the unreliable texture regions, the circuitry 202 may refine the reconstructed 3D mesh 318. The refined 3D mesh 318 may correspond to one temporal frame of a free-viewpoint video and may reliably include the texture of the human-object 308 in the corresponding set of color images 306.

At 302e, a temporal processing operation may be executed. The temporal processing operation may include a mesh tracking operation. At 302f, the mesh tracking operation may be executed. In the mesh tracking operation, the circuitry 202 may select the refined 3D mesh 318 (obtained at 302d) as a key-frame and generate a mesh sequence based on a suitable mesh tracking method that uses the refined 3D mesh 318 as the key-frame. The mesh sequence may include a sequence of 3D meshes as a sequence of temporal frames, which may have reduced flickering artifacts and reduced temporal inconsistency. The suitable mesh tracking method may ensure that per-vertex correspondence between nodes (or vertices) on every consecutive pair of 3D meshes of the human-object 308 is established. Additionally, or alternatively, the circuitry 202 may also estimate, by the suitable mesh tracking method, parameters of non-rigid motion and/or rigid motion (articulate motion (LBS parameters)) between the nodes (or vertices) on every consecutive pair of 3D meshes of the human-object 308.

For example, the refined 3D mesh 318 (obtained at 302d) may be rendered as a first temporal frame and may include on-body nodes and key-points as skeletal joints of the human-object 308. Subsequent to the first temporal frame, a second temporal frame may be obtained by establishing per-vertex correspondence between the on-body nodes (or the vertices) and the key-points on the refined 3D mesh 318 and on-body nodes and key-points on a 3D mesh of the human-object 308 for the second temporal frame.

Figure 4:
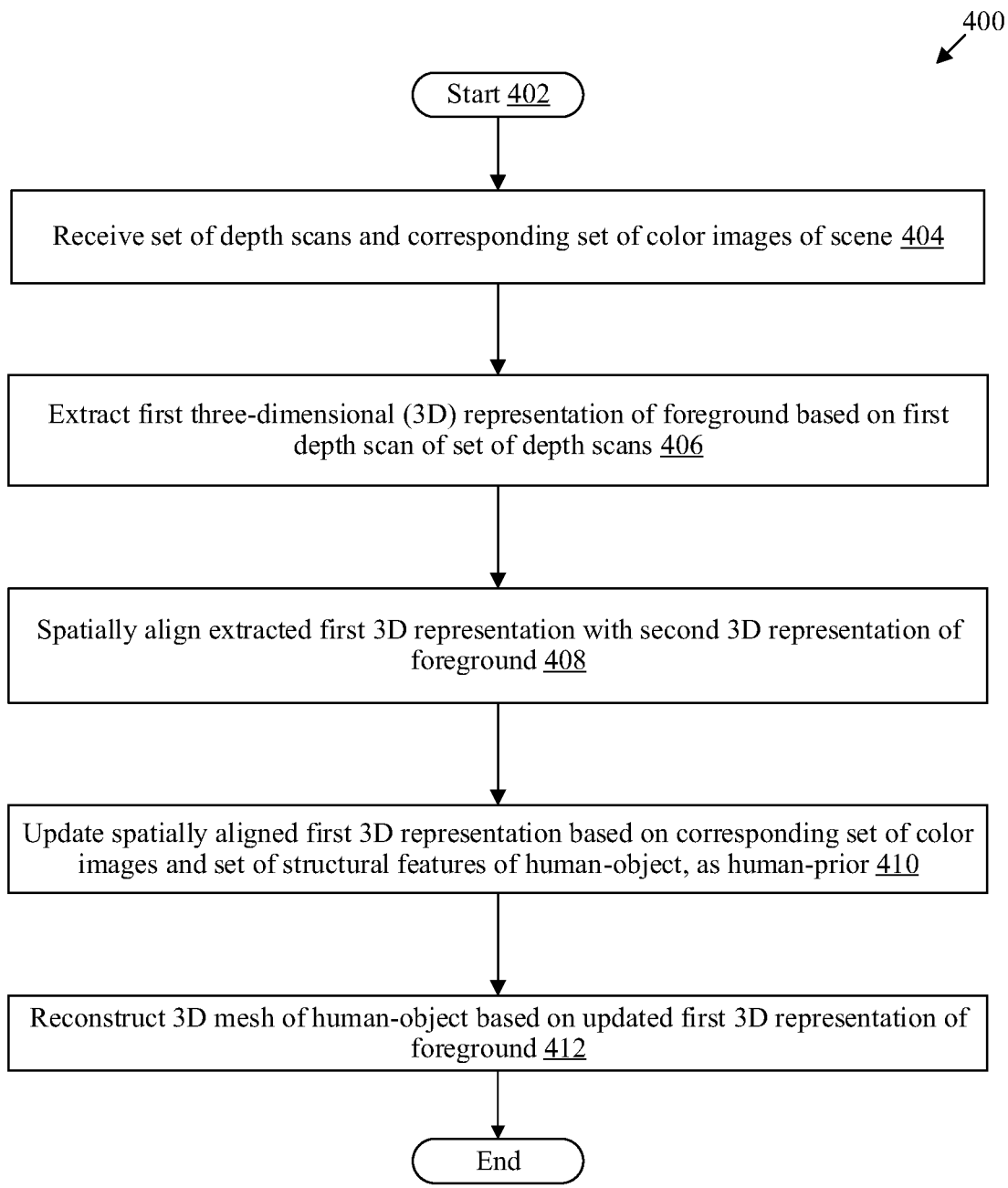
FIG. 4 depicts a flowchart that illustrates exemplary operations for online calibration of 3D scan data from multiple viewpoints, in accordance with an embodiment of the disclosure.

FIG. 4 depicts a flowchart that illustrates exemplary operations for online calibration of 3D scan data from multiple viewpoints, in accordance with an embodiment of the disclosure. FIG. 4 is explained in conjunction with elements from FIGS. 1, 2, 3A, and 3B. With reference to FIG. 4, there is shown a flowchart 400. The operations from 402 to 412 may be implemented by any computing system, for example, by the calibration system 102 of FIG. 2. The operations may start at 402 and proceed to 404.

At 404, a set of depth scans and a corresponding set of color images of a scene may be received. The scene may include a human-object 110 as part of a foreground of the scene. In accordance with an embodiment, the circuitry 202 may be configured to receive the set of depth scans and the corresponding set of color images of a scene including the human-object 110 as part of a foreground of the scene.

At 406, a first 3D representation of the foreground may be extracted based on a first depth scan of the set of depth scans. The first 3D representation may be associated with a first viewpoint in the 3D environment 104. In accordance with an embodiment, the circuitry 202 may be configured to extract the first 3D representation of the foreground based on the first depth scan of the set of depth scans.

At 408, the extracted first 3D representation may be aligned spatially with a second 3D representation of the foreground. The second 3D representation may be associated with a second viewpoint in the 3D environment 104. In accordance with an embodiment, the circuitry 202 may be configured to spatially align the extracted first 3D representation with the second 3D representation of the foreground.

At 410, the spatially aligned first 3D representation may be updated based on the corresponding set of color images and a set of structural features of the human-object 110, as a human-prior. In accordance with an embodiment, the circuitry 202 may be configured to update the spatially aligned first 3D representation based on the corresponding set of color images and a set of structural features of the human-object 110, as the human prior.

At 412, a 3D mesh of the human-object 110 may be reconstructed based on the updated first 3D representation of the foreground. In accordance with an embodiment, the circuitry 202 may be configured to reconstruct 3D mesh of human-object 110 based on updated first 3D representation of foreground. Control may pass to end.

Various embodiments of the disclosure may provide a non-transitory computer readable medium and/or storage medium having stored thereon, instructions executable by a machine and/or a computer to operate a calibration system. The instructions may cause the machine and/or computer to perform operations which include reception of a set of depth scans and a corresponding set of color images of a scene comprising a human-object as part of a foreground of the scene. The operations further include extracting a first three-dimensional (3D) representation of the foreground based on a first depth scan of the set of depth scans. The first three-dimensional (3D) representation may be associated with a first viewpoint in a 3D environment. The operations further include spatially aligning the extracted first 3D representation with a second 3D representation of the foreground. The second three-dimensional (3D) representation may be associated with a second viewpoint in a 3D environment. The operations may further include update the spatially aligned first 3D representation based on the corresponding set of color images and a set of structural features of the human-object, as a human-prior. The operations may further include reconstructing a 3D mesh of the human-object based on the updated first 3D representation of the foreground.

Exemplary aspects of the disclosure may include a calibration system 102 that includes circuitry 202. The circuitry 202 may be configured to receive the set of depth scans 304 and the corresponding set of color images 306 of a scene. The scene may include the human-object 308 as part of a foreground of the scene in the 3D environment 104. As an example, the set of depth scans 304 and the corresponding set of color images 306 may be acquired by the plurality of scanning devices 112a, 112b, 112c, and 112d from a corresponding set of viewpoints in the 3D environment 104. The plurality of scanning devices 112a, 112b, 112c, and 112d may collectively form a multi-camera network. The multi-camera network may have a combined field-of-view that may cover an entire surface of the human-object 308 present in the scene.

The circuitry 202 may be further configured to extract a first three-dimensional (3D) representation 310a of the foreground based on the first depth scan 304a of the set of depth scans 304. The first 3D representation 310a may be associated with a first viewpoint in the 3D environment 104. The circuitry 202 may be further configured to extract the second 3D representation 310b of the foreground based on the second depth scan 304b of the set of depth scans 304. The second 3D representation 310b may be associated with a second viewpoint in the 3D environment 104. The circuitry 202 may be further configured to spatially align the extracted first 3D representation 310a with the second 3D representation 310b and update the spatially aligned first 3D representation 310a based on the corresponding set of color images 306 and the set of structural features 316 of the human-object 308, as a human-prior. The circuitry 202 may be further configured to reconstruct the 3D mesh 318 of the human-object 308 based on the updated first 3D representation 310a of the foreground.

In accordance with an embodiment, the circuitry 202 may be configured to estimate a set of candidate transformations for the spatial alignment of the extracted first 3D representation 310a with the second 3D representation 310b. For each candidate transformation of the estimated set of candidate transformations, the circuitry 202 may be configured to compute a visibility error-metric. The circuitry 202 may be further configured to select a candidate transformation from the estimated set of candidate transformations for which the computed visibility error-metric is a minimum. The circuitry 202 may be further configured to spatially align the extracted first 3D representation 310a with the second 3D representation 310b based on the selected candidate transformation.

In accordance with an embodiment, the circuitry 202 may be configured to extract the third 3D representation 312a of the ground surface 314 in the scene. The extraction of the third 3D representation 312a of the ground surface 314 may be based on the first depth scan 304a associated with the first viewpoint. In accordance with an embodiment, the circuitry 202 may be configured to extract the fourth 3D representation 312b of the ground surface 314 in the scene. The extraction of the fourth 3D representation 312b of the ground surface 314 may be based on the second depth scan 304b associated with the second viewpoint. The circuitry 202 may be further configured to spatially align the extracted third 3D representation 312a with the fourth 3D representation 312b. The spatially aligned first 3D representation 310a may be updated further based on the spatial alignment of the extracted third 3D representation 312a with the fourth 3D representation 312b.

In accordance with an embodiment, the circuitry 202 may be further configured to estimate a first set of two-dimensional (2D) feature points for the set of structural features 316 based on a first color image 306a. The set of structural features 316 may include, but not limited to, a skeleton joint prior 316c, a hand prior 316b, and a face prior 316a of the human-object 308. The circuitry 202 may be further configured to estimate a second set of 2D feature points for the set of structural features 316 based on a second color image. The first color image may correspond to the first depth scan 304a associated with the first viewpoint and the second color image may correspond to the second depth scan 304b associated with the second viewpoint. The circuitry 202 may be further configured to compute the set of 3D feature points for the set of structural features 316 based on the estimated first set of 2D feature points and the estimated second set of 2D feature points. The circuitry 202 may be further configured to update the spatially aligned first 3D representation 310a based on the computed set of 3D feature points.

In accordance with an embodiment, the extracted first 3D representation 310a may include a first plurality of 3D points that may represent at least a surface portion of the human-object 308 from the first viewpoint. The circuitry 202 may be configured to compute a distance between the computed set of 3D feature points and a portion of the first plurality of 3D points corresponding to the set of structural features 316 in the extracted first 3D representation 310a. The circuitry 202 may be further configured to estimate a global energy function based on the computed distance. The circuitry 202 may be further configured to update the spatially aligned first 3D representation 310a further based on whether the estimated global energy function is a minimum.

In accordance with an embodiment, the circuitry 202 may be configured to reconstruct the 3D mesh 318 of the human-object 308 based on the updated first 3D representation 310a of the foreground. The reconstructed 3D mesh 318 may correspond to a watertight mesh that may partially captures a texture of the human-object 308 in the corresponding set of color images 306. The circuitry 202 may be configured to transfer texture values from reliable textured regions on temporally neighboring or distant meshes of the human-object 308 to unreliable textured regions on the reconstructed 3D mesh 318. The circuitry 202 may be further configured to refine the 3D mesh 318 based on the transfer of the texture values. The refined 3D mesh 318 may correspond to one temporal frame of a free-viewpoint video.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A calibration system, comprising:
   circuitry configured to:
   receive a set of depth scans and a corresponding set of color images of a scene comprising a human-object as part of a foreground of the scene;
   extract a first three-dimensional (3D) representation of the foreground based on a first depth scan of the set of depth scans, wherein the first 3D representation is associated with a first viewpoint in a 3D environment;
   spatially align the extracted first 3D representation with a second 3D representation of the foreground, wherein the second 3D representation is associated with a second viewpoint in the 3D environment;
   update the spatially aligned first 3D representation based on the corresponding set of color images and a set of structural features of the human-object, as a human-prior;
   extract a third 3D representation of a ground surface in the scene based on the first depth scan associated with the first viewpoint;
   spatially align the extracted third 3D representation of the ground surface with a fourth 3D representation of the ground surface, the fourth 3D representation being associated with the second viewpoint of the scene;

update the spatially aligned first 3D representation further based on the spatial alignment of the extracted third 3D representation with the fourth 3D representation; and
reconstruct a 3D mesh of the human-object based on the updated first 3D representation of the foreground.

2. The calibration system according to claim 1, further comprising a plurality of scanning devices configured to acquire the set of depth scans and the corresponding set of color images from a corresponding set of viewpoints in the 3D environment.

3. The calibration system according to claim 2, wherein the plurality of scanning devices, collectively, form a multi-camera network having a combined field-of-view that covers an entire surface of the human-object.

4. The calibration system according to claim 1, wherein the circuitry is further configured to:
estimate a set of candidate transformations for the spatial alignment of the extracted first 3D representation with the second 3D representation;
compute a visibility error-metric for each candidate transformation of the estimated set of candidate transformations;
select, from the estimated set of candidate transformations, a candidate transformation for which the computed visibility error-metric is a minimum; and
spatially align the extracted first 3D representation with the second 3D representation based on the selected candidate transformation.

5. The calibration system according to claim 1, wherein the set of structural features comprises a skeleton joint prior, a hand prior, and a face prior of the human-object.

6. The calibration system according to claim 1, wherein the circuitry is further configured to:
estimate a first set of two-dimensional (2D) feature points for the set of structural features based on a first color image of the corresponding set of color images; and
estimate a second set of 2D feature points for the set of structural features based on a second color image of the corresponding set of color images, wherein the first color image corresponds to the first depth scan associated with the first viewpoint, and
the second color image corresponding to a second depth scan associated with the second viewpoint.

7. The calibration system according to claim 6, wherein the circuitry is further configured to compute a set of 3D feature points for the set of structural features based on the estimated first set of 2D feature points and the estimated second set of 2D feature points.

8. The calibration system according to claim 7, wherein the circuitry is further configured to update the spatially aligned first 3D representation based on the computed set of 3D feature points.

9. The calibration system according to claim 7, wherein the extracted first 3D representation comprises a first plurality of 3D points representing at least a surface portion of the human-object from the first viewpoint.

10. The calibration system according to claim 9, wherein the circuitry is further configured to:
compute a distance between the computed set of 3D feature points and a portion of the first plurality of 3D points corresponding to the set of structural features in the extracted first 3D representation;
estimate a global energy function based on the computed distance; and update the spatially aligned first 3D representation further based on the estimated global energy function being a minimum.

11. The calibration system according to claim 1, wherein the reconstructed 3D mesh corresponds to a watertight mesh that at least partially captures a texture of the human-object in the corresponding set of color images.

12. The calibration system according to claim 11, wherein the circuitry is further configured to:
transfer texture values from reliable textured regions on temporally neighboring or distant meshes of the human-object to unreliable textured regions on the reconstructed 3D mesh; and
refine the 3D mesh based on the transfer,
wherein the refined 3D mesh corresponds to one temporal frame of a free-viewpoint video.

13. A method, comprising:
receiving a set of depth scans and a corresponding set of color images of a scene comprising a human-object as part of a foreground of the scene;
extracting a first three-dimensional (3D) representation of the foreground based on a first depth scan of the set of depth scans, wherein the first 3D representation is associated with a first viewpoint in a 3D environment;
spatially aligning the extracted first 3D representation with a second 3D representation of the foreground, wherein the second 3D representation is associated with a second viewpoint in the 3D environment;
updating the spatially aligned first 3D representation based on the corresponding set of color images and a set of structural features of the human-object, as a human-prior;
extracting a third 3D representation of a ground surface in the scene based on the first depth scan associated with the first viewpoint;
spatially aligning the extracted third 3D representation of the ground surface with a fourth 3D representation of the ground surface, the fourth 3D representation being associated with the second viewpoint of the scene;
updating the spatially aligned first 3D representation further based on the spatial alignment of the extracted third 3D representation with the fourth 3D representation; and
reconstructing a 3D mesh of the human-object based on the updated first 3D representation of the foreground.

14. The method according to claim 13, further comprising:
estimating a first set of two-dimensional (2D) feature points for the set of structural features based on a first color image of the corresponding set of color images;
estimating a second set of 2D feature points for the set of structural features based on a second color image of the corresponding set of color images, wherein the first color image corresponds to the first depth scan associated with the first viewpoint, and
the second color image corresponding to a second depth scan associated with the second viewpoint; and
computing a set of 3D feature points for the set of structural features based on the estimated first set of 2D feature points and the estimated second set of 2D feature points.

15. The method according to claim 14, further comprising updating the spatially aligned first 3D representation based on the computed set of 3D feature points.

16. A non-transitory computer-readable medium having stored thereon, computer-executable instructions that when executed by a calibration system, causes the calibration system to execute operations, the operations comprising:

receiving a set of depth scans and a corresponding set of color images of a scene comprising a human-object as part of a foreground of the scene;

extracting a first three-dimensional (3D) representation of the foreground based on a first depth scan of the set of depth scans, wherein the first 3D representation is associated with a first viewpoint in a 3D environment;

spatially aligning the extracted first 3D representation with a second 3D representation of the foreground, wherein the second 3D representation is associated with a second viewpoint in the 3D environment;

updating the spatially aligned first 3D representation based on the corresponding set of color images and a set of structural features of the human-object, as a human-prior;

extracting a third 3D representation of a ground surface in the scene based on the first depth scan associated with the first viewpoint;

spatially aligning the extracted third 3D representation of the ground surface with a fourth 3D representation of the ground surface, the fourth 3D representation being associated with the second viewpoint of the scene;

updating the spatially aligned first 3D representation further based on the spatial alignment of the extracted third 3D representation with the fourth 3D representation; and reconstructing a 3D mesh of the human-object based on the updated first 3D representation of the foreground.

\* \* \* \* \*